Patented July 27, 1954

2,684,917

UNITED STATES PATENT OFFICE

2,684,917

SOFTENING, GELATINIZING, AND SWELLING AGENTS AND METHODS OF MANUFACTURING THE SAME

Wolfgang Gündel, Dusseldorf-Oberkassel, and Helmut Damm, Dusseldorf-Benrath, Germany, assignors to Henkel & Cie, G. m. b. H., Dusseldorf-Holthausen, Germany, a limited liability company of Germany No Drawing. Application November 15, 1951,
Serial No. 256,616

Claims priority, application Germany
December 8, 1950

22 Claims. (Cl. 106—176)

This invention relates to softening, gelatinizing and swelling agents for vinyl polymers, cellulose derivatives, polyamides, polyurethanes and other synthetic substances and to methods of manufacturing such softening, gelatinizing and swelling agents.

An object of the present invention is to provide softening, gelatinizing and swelling agents of improved qualities which may be manufactured by improved simple, inexpensive and efficient methods.

Other objects of the present invention will become apparent in the course of the following specification.

In accomplishing the objects of the present invention it was found that esters of N-hydroxyethyl phthalimidine, i. e. compounds of the general formula,

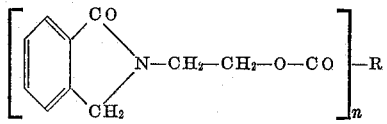

wherein $n$ is one of the numerals 1, 2 or 3, and R is any desired organic residue, constitute valuable softening agents, gelatinizing agents or swelling agents for vinyl polymers, cellulose esters and cellulose ethers, polyamides or polyurethanes, chlorinated rubber and other high molecular substances. The residue R may be a straight-chain, branched, cyclic, or unsaturated or substituted hydrocarbon residue, or it may be an organic residue containing heteroatoms or heteroatom groups.

Softeners of this type are produced by esterifying N-hydroxy ethyl phthalimidine having a melting point of 115° C. (which may be easily obtained, by way of example, from phthalide, and monoethanolamine) with any desirable carboxylic acid. It is also possible to start with free acids as well as with their functional derivatives such as their anhydrides, halogenides or esters.

As esterification components are suitable here not only such acids or acid mixtures, the esterification products of which N-hydroxy ethyl phthalimidine are liquid at normal temperatures such as for example, esters of acetic acid, propionic acid, ethoxyacetic acid, butoxyacetic acid and, preferably mixtures of aliphatic carboxylic acids with 4–7 or 7–9 carbon atoms, produced during oxidation of paraffins of natural or synthetic origin, but also are suitable such acids or acid mixtures the esterification products of which crystallize at normal temperatures, since in many instances the latter have such an excellent affinity to synthetic products that they do not crystallize any more out of the produced masses. By way of example, the following carboxylic acids may be used by themselves or in the form of their functional derivatives for the esterification with N-hydroxy ethyl phthalimidine: acetic acid, propionic acid, butyric acid, chloro acetic acid, dichloro acetic acid, acrylic acid, dimethylacrylic acid, caproic acid, capric acid, lauric acid, ethoxyacetic acid, butoxyacetic acid, octloxyacetic acid, cyclohexyloxyacetic acid, cyclohexylacetic acid, nicotinic acid, benzoic acid, 4-chloro benzoic acid, 2,4-dichloro benzoic acid, salicylic acid, 4-nitrobenzoic acid, p-hydroxy benzoic acid, phenoxyacetic acid, phenylacetic acid, cinnamic acid, 2-furan acrylic acid, piperonyl-acrylic acid and many others, as well as mixtures of such acids as, for example, mixtures of aliphatic carbonic acids with 4–6 or 7–9 carbon atoms, which are obtained, for example, during oxidation of Fischer-Tropsch paraffins as first-run acids. Polybasic acids are also usable, such as malonic acid, succinic acid, adipic acid, sebacic acid, phthalic acid, terephthalic acid and many others.

Manufacturing requirements differ, depending as to whether the initial material is free acid or one of its functional derivatives; they correspond to standard conditions, namely, it is possible to operate with or without catalysts, with or without solvents or detergents, and with or without acid binding means, as set forth in the following examples. The described esterification products are worked into acetyl-cellulose, aceto-butyryl-cellulose, benzyl-cellulose or nitrocellulose, polyvinyl chloride, polyvinyl acetate or mixed polymers, polyamides, polyurethane or chlorinated rubber under usual and generally known conditions.

The following examples set forth in an illustrative manner and not in a limiting sense some of the possible methods of manufacturing the new compounds and their utilization as softening, swelling and gelatinizing agents. It is apparent that there are many deviations from and modifications of the described methods which fall within the scope of the present invention.

*Example 1*

36.5 parts by weight of N-hydroxy ethyl phthalimidine (0.2 mol.) and 54 parts by weight acetic acid anhydride, after the addition of a few drops pyridine, are heated to boiling under reflux for 4 hours. After the removal by distillation of the formed acetic acid or of the excess of acetic acid anhydride, there are obtained 43 parts by weight of N-acetoxyethylphthalimidine in the form of a colorless oil which is capable of distillation in an undecomposed state at a boiling point of 194°–196° C./3 mm. Hg.

(Saponification number: Found: 256; calculated: 257.)

Example 2

177 parts by weight of N-hydroxy ethyl phthalimidine (1 mol.) and 222 parts by weight (1.5 mol.) of a mixture of first run acids from a paraffin oxidation with 7-9 carbon atoms having an acidity number of 378 are esterified by slowly increased heating, until the theoretically possible amount of water is collected in the separator. After removal of excess acid by distillation or raffination with caustic soda and the immediately following distillation under reduced pressure there are obtained 279 parts by weight of N-hydroxy ethyl phthalimidine-first run acid-$C_{7-9}$-esters having a boiling point of 225° C.–242° C./1 mm. Hg.

(Saponification number: Found 183; calculated: 182. Nitrogen: Found 4.50%; calculated 4.45%.)

Example 3

Same as Example 2, except that 222 parts by weight of a mixture of first run acids with 7-9 carbon atoms are substituted by 172.5 parts by weight (1.5 mols.) of a mixture of first-run acids with 4-6 carbon atoms having an acidity number 487; then there are obtained 244 parts by weight of N-hydroxy ethyl phthalimidine-first run acid-$C_{4-6}$-esters having a boiling point of 214° C.–238° C./2 mm. Hg.

(Saponification number: Found 201; calculated: 204. Nitrogen: Found 5.0%; calculated: 5.1%.)

Example 4

29.4 parts by weight of adipic acid (0.2 mol.) and 78.6 parts by weight of N-hydroxy ethyl phthalimidine (0.44 mol.) are slowly heated in an esterification vessel with the temperature slowly rising to 240° C. until the amount of water collected in the separator corresponds to the theoretically possible amount (7.2 parts by weight). The crude ester precipitating as a viscous nearly colorless oil is dissolved in 600 parts by weight of benzene and is washed with diluted caustic soda and water. After the removal of benzene by distillation there are produced 80 parts by weight of pure di-(N-hydroxy ethyl phthalimidine) adipic acid ester which when cold solidifies in crystal form. The melting point of the product crystallized from benzene is 113° C.–114° C.

(Saponification number: Found: 244; calculated: 240. Nitrogen: Found: 5.6%; calculated: 6.0%.)

Example 5

71.5 parts by weight of N-hydroxy ethyl phthalimidine (0.4 mol.) and 49 parts by weight of dimethylaniline (0.4 mol.) are dissolved in 500 parts by weight of acetone. After adding 71 parts by weight of o-chloro benzoylchloride (0.4 mol.), the mixture is heated to boiling under reflux for several hours, whereupon acetone was removed by distillation and the residue was washed with diluted caustic soda and diluted hydrochloric acid, preferably after being diluted with ether. After the removal of ether a residue remains which crystallizes when cold, and which consists of 112.5 parts by weight. The resulting N-hydroxy ethyl phthalimidine-o-chloro benzoic acid ester boils without decomposing at 263° C.–265° C./1 mm. Hg and can be also crystallized from a mixture of benzine and benzene. The melting point is 71° C., the chlorine content: 11.4% (calculated 11.0%).

Example 6

12.5 parts by weight of acetyl cellulose are dissolved in a mixture consisting of 15 parts by weight of acetone, 10 parts by weight of methanol, 10 parts by weight of ethyl acetate, 10 parts by weight of methyl acetate, 10 parts by weight of benzene, 10 parts by weight of methylene chloride and 10 parts by weight ethyl lactate, and 12.5 parts by weight N-acetoxyethylphthalimidine, obtained according to the method of Example 1, are added to the mixture. The lacquer, which may be pigmented if desired, produces upon its under surface firmly adhering films of high tensile strength and great resistance against tearing and can be used as cable lacquer.

Example 7

To a solution of nitrocellulose in a mixture consisting of 40 parts by weight of butyl acetate, 15 parts by weight of toluene, 15 parts by weight of xylene, 5 parts by weight of butanol and 5 parts by weight of alcohol there are added 5 parts by weight of di-phthalimidino-N-ethyl esters of adipic acid crystallized out of benzene and produced according to the method of Example 4. The film which is left after evaporating the solvent is characterized by a high degree of adherence and exceptional surface hardness.

Example 8

75 parts by weight of polyvinyl chloride and 25 parts by weight of an ester produced from n-hydroxy ethyl phthalimidine and a mixture of paraffin-oxydation first run acids according to the method of Example 2, are mixed thoroughly and hot-rolled upon calenders at 150° C. to 160° C. to a homogenous film. This mass can be used as a covering for a cable strand. The insulating film is of high strength and also has good resistance against deformation.

If 60 parts by weight of polyvinyl chloride are worked in the same manner with 40 parts by weight of the softener, a soft film is produced which can be utilized in the manufacture of artificial leather.

Example 9

75 parts by weight of a mixed polymer consisting of 80% polyvinyl chloride and 20% acrylic acid-ethyl ester are mixed with 25 parts by weight of the first run acid ester of N-hydroxy ethyl phthalimidine used in the method of Example 8, the viscous dispersion thus obtained being worked upon a friction roller at 140° C.–150° C. The plastic-elastic mass is most suitable for various textile uses.

Example 10

100 parts by weight of a 50% emulsion of polyvinyl acetate of medium polymerization degree of 300-500, as obtained according to a known emulsion-polymerization process, are thoroughly mixed with a solution of 15 parts by weight of an esterification product of first run acids of paraffin oxidation with 4-6 C-atoms and N-hydroxy ethyl phthalimidine (B. Pt. at 2 mm. of Hg 214–238°), obtained according to the method of Example 3, in 5 parts by weight of butyl acetate. This dispersion is suitable as glue for gluing glass, plastics, metals and other materials.

The gluing effect can be increased, if desired, by the addition of mechanically treated starch glue. Such combinations are most suitable for weather resisting wall coatings.

Example 11

A lacquer, consisting of 20 parts by weight of chlorinated rubber (chlorine content 63%), 5 parts by weight N-acetoxyethyl-phthalimidine and 65 parts by weight of a mixture of equal parts of toluene an xylene, which for example, can be pigmented with 10 parts by weight of titanium dioxide, is applied in several layers upon a metal surface which is free of rust. The remaining lacquer layer which is similar to enamel has excellent elasticity.

It is apparent that the above examples have been given solely by way of exemplification and not by way of limitation and that they are subject to wide variations and modifications within the scope of the present invention. All such variations and modifications are to be included within the scope of the present invention.

What is claimed is:

1. In a process of preparing a softening, gelatinizing, and swelling agent for plastic materials, the steps comprising condensing phthalide with monoethanolamine, and esterifying the resulting N-hydroxy ethyl phthalimidine with an organic carboxylic acid and an ester-forming derivative of an organic carboxylic acid.

2. A lacquer, comprising a chlorinated rubber compound dissolved in a solvent mixture and, as a plasticizer, an ester of N-hydroxy ethyl phthalimidine with an organic carboxylic acid.

3. As a new softening, gelatinizing, and swelling agent for vinyl polymers, cellulose derivatives, polyamides, polyurethanes and other plastic material, an ester of N-hydroxy ethyl phthalimidine with an organic carboxylic acid.

4. As a new softening, gelatinizing, and swelling agent for vinyl polymers, cellulose derivatives, polyamides, polyurethanes and other plastic material, an ester of N-hydroxy ethyl phthalimidine with an aliphatic carboxylic acid.

5. As a new softening, gelatinizing, and swelling agent for vinyl polymers, cellulose derivatives, polyurethanes and other plastic material, an ester of N-hydroxy ethyl phthalimidine with an aliphatic carboxylic acid having 4 to 9 carbon atoms in its molecule.

6. As a new softening, gelatinizing, and swelling agent for vinyl polymers, cellulose derivatives, polyamides, polyurethanes and other plastic material, an ester of N-hydroxy ethyl phthalimidine with an aliphatic dicarboxylic acid.

7. As a new softening, gelatinizing, and swelling agent for vinyl polymers, cellulose derivatives, polyamides, polyurethanes and other plastic material, an ester of N-hydroxy ethyl phthalimidine with an aromatic acid.

8. As a new softening, gelatinizing, and swelling agent for polymers, cellulose derivatives, polyamides, polyurethanes and other plastic material, the acetic acid ester of N-hydroxy ethyl phthalimidine.

9. As a new softening, gelatinizing, and swelling agent for vinyl polymers, cellulose derivatives, polyamides, polyurethanes and other plastic material, the adipic acid ester of N-hydroxy ethyl phthalimidine.

10. As a new softening, gelatinizing, and swelling agent for vinyl polymers, cellulose derivatives, polyamides, polyurethanes and other plastic material, the ester of N-hydroxy ethyl phthalimidine with a mixture of first run acids obtained by paraffin oxidation, said acids having 7-9 carbon atoms in their molecule.

11. As a new softening, gelatinizing, and swelling agent for vinyl polymers, cellulose derivatives, polyamides, polyurethanes and other plastic material, the ester of N-hydroxy ethyl phthalimidine with a mixture of first run acids obtained by paraffin oxidation, said acids having 4 to 6 carbon atoms in their molecule.

12. As a new softening, gelatinizing, and swelling agent for vinyl polymers, cellulose derivatives, polyamides, polyurethanes and other plastic material, the o-chloro benzoic acid ester of N-hydroxy ethyl phthalimidine.

13. In a process of preparing a softening, gelatinizing, and swelling agent for plastic materials, the step comprising esterifying N-hydroxy ethyl phthalimidine with an organic carboxylic acid compound selected from the group consisting of an organic carboxylic acid and an ester-forming derivative of an organic carboxylic acid.

14. In a process of preparing a softening, gelatinizing, and swelling agent for plastic materials, the step comprising esterifying N-hydroxy ethyl phthalimidine with an organic acid anhydride.

15. In a process of preparing a softening, gelatinizing, and swelling agent for plastic materials, the step comprising esterifying N-hydroxy ethyl phthalimidine with an organic acid chloride.

16. In a process of preparing a softening, gelatinizing, and swelling agent for plastic materials according to claim 13, wherein the organic carboxylic acid compound is an aliphatic carboxylic acid compound.

17. In a process of preparing a softening, gelatinizing, and swelling agent for plastic materials according to claim 13, wherein the organic carboxylic acid compound is an aliphatic carboxylic acid compound having 4 to 9 carbon atoms in its molecule.

18. In a process of preparing a softening, gelatinizing, and swelling agent for plastic materials according to claim 13, wherein the organic carboxylic acid compound is an aromatic carboxylic acid compound.

19. In a process of preparing a softening, gelatinizing, and swelling agent for plastic materials according to claim 13, wherein the organic carboxylic acid compound is an aliphatic dicarboxylic acid compound.

20. A plastic material consisting of a synthetic resin and, as a softening, gelatinizing, and swelling agent, an ester of N-hydroxy ethyl phthalimidine with an organic carboxylic acid.

21. A cellulose derivative lacquer, comprising a cellulose derivative dissolved in a lacquer solvent mixture and, as plasticizing agent, an ester of N-hydroxy ethyl phthalimidine with an organic carboxylic acid, said lacquer yielding, on evaporation of the solvent mixture, a firmly adhering, highly resistant coating.

22. A plastic composition of matter, comprising a substantial amount of a polyvinyl derivative selected from the group consisting of polyvinyl chloride, polyvinyl acetate, mixtures thereof, and mixtures of said polyvinyl derivatives with polyacrylic acid esters, and, as a plasticizer, an ester of N-hydroxy ethyl phthalimidine with an organic acid.

References Cited in the file of this patent

UNITED STATES PATENTS

| Number | Name | Date |
|---|---|---|
| 1,908,705 | Jaeger | May 16, 1933 |
| 2,487,105 | Cornwell | Nov. 8, 1949 |
| 2,487,106 | Cornwell | Nov. 8, 1949 |